(12) United States Patent
Lee

(10) Patent No.: US 6,529,510 B1
(45) Date of Patent: Mar. 4, 2003

(54) ATM SWITCHING APPARATUS AND METHOD THEREOF

(75) Inventor: Tae-Jae Lee, Koonpo (KR)

(73) Assignee: LG Information & Communications, Ltd., Seoul (KR)

( * ) Notice: Subject to any disclaimer, the term of this patent is extended or adjusted under 35 U.S.C. 154(b) by 0 days.

(21) Appl. No.: 09/196,230

(22) Filed: Nov. 20, 1998

(30) Foreign Application Priority Data

Dec. 19, 1997 (KR) ............................................ 97-71035

(51) Int. Cl.⁷ ................................................ H04L 12/28
(52) U.S. Cl. ................................................ 370/395.61
(58) Field of Search .......................... 370/395.1, 395.5, 370/395.7, 395.71, 395.72, 401, 458, 465, 466, 468, 473, 474, 395.6, 395.61, 395.62, 395.63, 395.64, 395.65, 395.31

(56) References Cited

U.S. PATENT DOCUMENTS

| | | | | |
|---|---|---|---|---|
| 5,805,588 A | * | 9/1998 | Petersen | 370/356 |
| 5,844,901 A | * | 12/1998 | Holden et al. | 370/399 |
| 5,883,893 A | * | 3/1999 | Rumer et al. | 370/395 |
| 5,889,773 A | * | 3/1999 | Stevenson, III | 370/352 |
| 5,930,477 A | * | 7/1999 | Uchida | 709/236 |
| 6,018,525 A | * | 1/2000 | Sucharczuk | 370/394 |
| 6,038,231 A | * | 3/2000 | Dolby et al. | 370/394 |
| 6,151,325 A | * | 11/2000 | Hluchyj | 370/398 |
| 6,201,806 B1 | * | 3/2001 | Moffett | 370/356 |
| 6,266,343 B1 | * | 7/2001 | Caves | 370/466 |
| 6,324,179 B1 | * | 11/2001 | Doshi et al. | 370/395.61 |

\* cited by examiner

*Primary Examiner*—Chau Nguyen
*Assistant Examiner*—Jasper Kwoh
(74) *Attorney, Agent, or Firm*—Fleshner & Kim, LLP

(57) ABSTRACT

An ATM switching apparatus for a switch system is connected between a plurality of trunk connection units connected with a TDM network and an ATM connection unit connected with an ATM network. The ATM cell converting unit converts trunk data, inputted over the trunk connection units, to an ATM cell which is outputted to the ATM connection unit or converts an ATM cell, supplied from the ATM connection unit, to trunk data which is to be outputted to the trunk connection units. Accordingly, the ATM switching apparatus and method have an advantage of mutually operating the TDM network and the ATM network.

26 Claims, 10 Drawing Sheets

FIG. 4

| | | V | CELL BUFFER NUMBER #0 |
|---|---|---|---|
| | CHANNEL 0 | | CELL BUFFER NUMBER #1 |
| | CHANNEL 1 | | ⋮ |
| TRUNK #0 | ⋮ | ≈ | |
| | CHANNEL N-1 | | |
| | CHANNEL 0 | | |
| | CHANNEL 1 | | |
| TRUNK #1 | ⋮ | ≈ | ⋮ |
| | CHANNEL N-1 | | |
| | ⋮ | | |
| | | ≈ | ⋮ |
| | CHANNEL 0 | | |
| | CHANNEL 1 | | |
| TRUNK #K-1 | ⋮ | ≈ | ⋮ |
| | CHANNEL N-1 | | |

FIG. 5

| | WSEG | WPTR |
|---|---|---|
| CELL BUFFER #0 | RSEG | PAL |
| CELL BUFFER #1 | | |
| | ⋮ | ⋮ |
| CELL BUFFER #(NXK-1) | | |

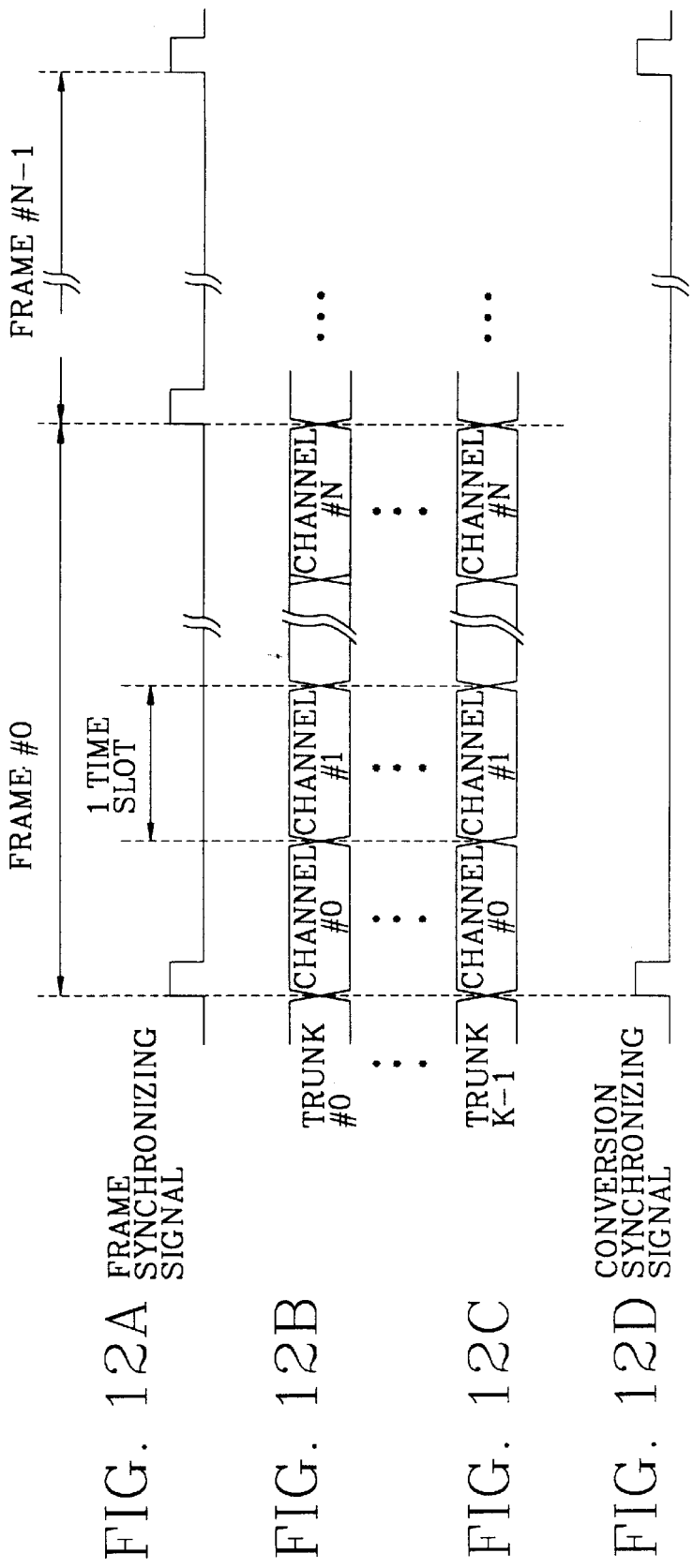

ATM SWITCHING APPARATUS AND METHOD THEREOF

BACKGROUND OF THE INVENTION

1. Field of the Invention

The present invention relates to a switching system, and more particularly to an asynchronous transfer mode (ATM) switching apparatus and method thereof.

2. Description of the Conventional Art

Generally, an ATM switch which asynchronously transfers various kinds of information has an advantage in which an information transfer speed is considerably fast, as compared with that of a conventional synchronous transfer mode. Accordingly, recently the study of applying the ATM switch to a broadband integrated service digital network (ISDN) has been proceeded, and accordingly standardization of various interfaces has become a new trend.

However, to promote high-speed information transmission, ATM networks have to be replaced for all of the networks which have been already equipped, which requires an immense expense.

Accordingly, it has been suggested that the time division multiplexing(TDM) network and the ATM network have to be utilized side by side. However, since a technique which interfaces the TDM network with the ATM network has not yet been developed, it is hard to establish a high-speed information network.

SUMMARY OF THE INVENTION

An object of the present invention is to provide an ATM switching apparatus and method thereof for a switch system which mutually operates a TDM network and an ATM network.

Another object of the present invention is to provide an ATM switching apparatus and method thereof which receives more trunks as many as possible in an identical data conversion speed.

To achieve these and other advantages and in accordance with the objects of the present invention, an ATM switching apparatus includes: a plurality of trunk connection units connected with a TDM network: an ATM connection unit connected with an ATM network: and an ATM cell converting unit for converting trunk data which are inputted through the trunk connection units to an ATM cell and outputting the ATM cell to the ATM connection unit, and also converting an ATM cell which is inputted through the ATM connection unit to trunk data and outputting the trunk data to the trunk connection units.

In addition, in order to achieve the above objects of the present invention, there is provided an ATM switching method, including the steps of: initializing operation for setting a link table, a cell buffer control table and a cell header table provided in a memory unit; reading a cell buffer number by accessing the link table in the memory unit in accordance with a trunk number and a time slot number which are supplied from a status/timing signal generating unit; reading a write segment bit, a write pointer and an effective payload length from the cell buffer control table by using the cell buffer number which have been read in the previous step; completing a cell payload by writing multiplexed trunk data in a corresponding cell buffer until the write pointer and the effective payload length which have been read have an identical value; writing a corresponding cell buffer number in a queue when the cell payload is completed; reading a number of the cell buffer in which the cell payload is completed from the queue and reading a corresponding cell header from the cell header table on the basis of the cell buffer number which has been read; and transmitting the cell header and the completed cell payload over a first-in first-out (FIFO) to an ATM switch system.

It is to be understood that both the foregoing general description and the following detailed description are exemplary and explanatory and are intended to provide and further explanation of the invention as claimed.

BRIEF DESCRIPTION OF THE DRAWINGS

The invention will be described in detail with reference to the following drawings in which like reference numerals refer to like elements wherein:

FIG. 4 is a diagram illustrating a link table;

FIG. 5 illustrates a cell buffer control table;

FIGS. 12A through 12D are diagrams illustrating frames between a data multiplexing/demultiplexing unit and a data store unit in FIG. 11.

DETAILED DESCRIPTION OF THE INVENTION

Reference will now be made in detail to the preferred embodiments of the present invention, examples of which are illustrated in the accompanying drawings.

Figure 1:
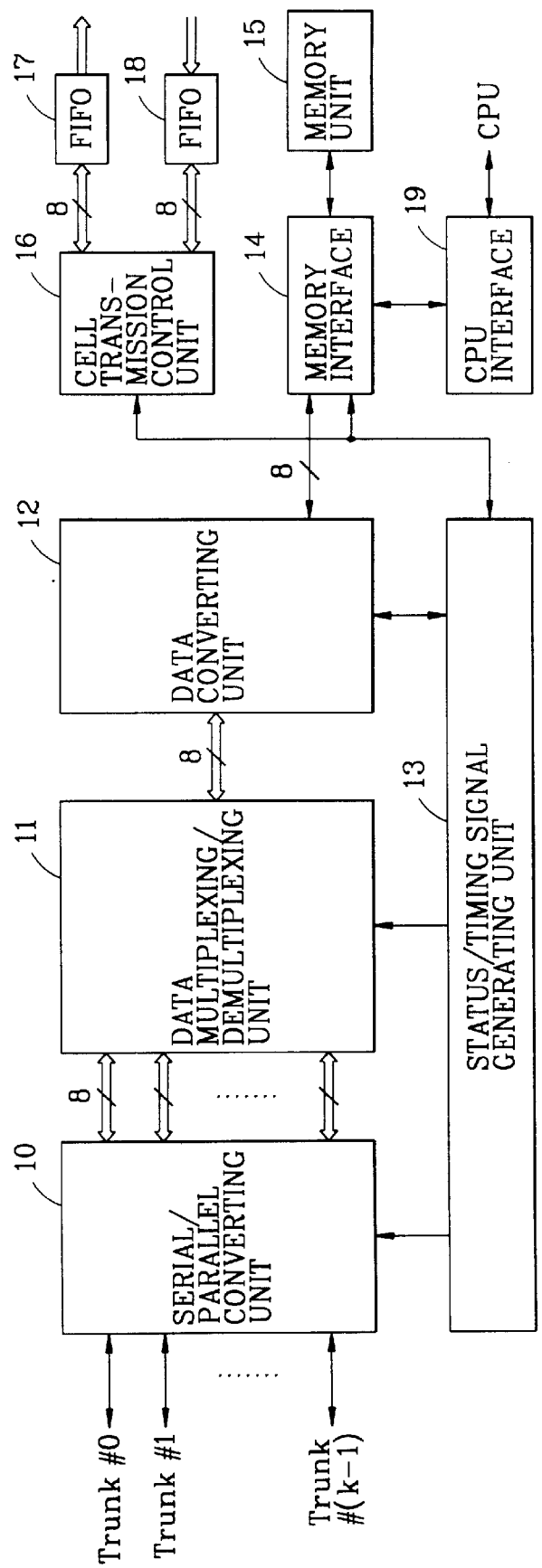
FIG. 1 is a block diagram illustrating an ATM switching apparatus for a switch system according to a first embodiment of the present invention.

FIG. 1 illustrates an ATM switching apparatus according to a first embodiment of the present invention.

As shown therein, a serial/parallel converting unit 10 converts serial data, which are received through a plurality of trunks in accordance with a frame synchronizing signal, to 8-bit parallel data and vice versa, and outputs the resultant data to the trunks. Here, it is noted that the plurality of trunks are correspondingly connected with a plurality of TDM trunk connection units, respectively.

A data multiplexing/demultiplexing unit 11 performs a time division multiplexing (TDM) operation for the parallel data, supplied from the serial/parallel converting unit 10, or demultiplexes TDM the data, and supplies the resultant data to the serial/parallel converting unit 10. A data converting unit 12 stores the 8-bit TDM data, which are supplied from the data multiplexing/demultiplexing unit 11, in a memory unit 15 as a cell type over a memory interface 14 in accordance with the frame synchronizing signal, or reads a cell stored in the memory unit 15 and outputs the resultant to the data multiplexing/demultiplexing unit 11. A status/timing signal generating unit 13 generates a frame synchronizing signal, a clock signal, a status signal, a trunk number and a time slot number in accordance with the control of a CPU.

Figure 9:
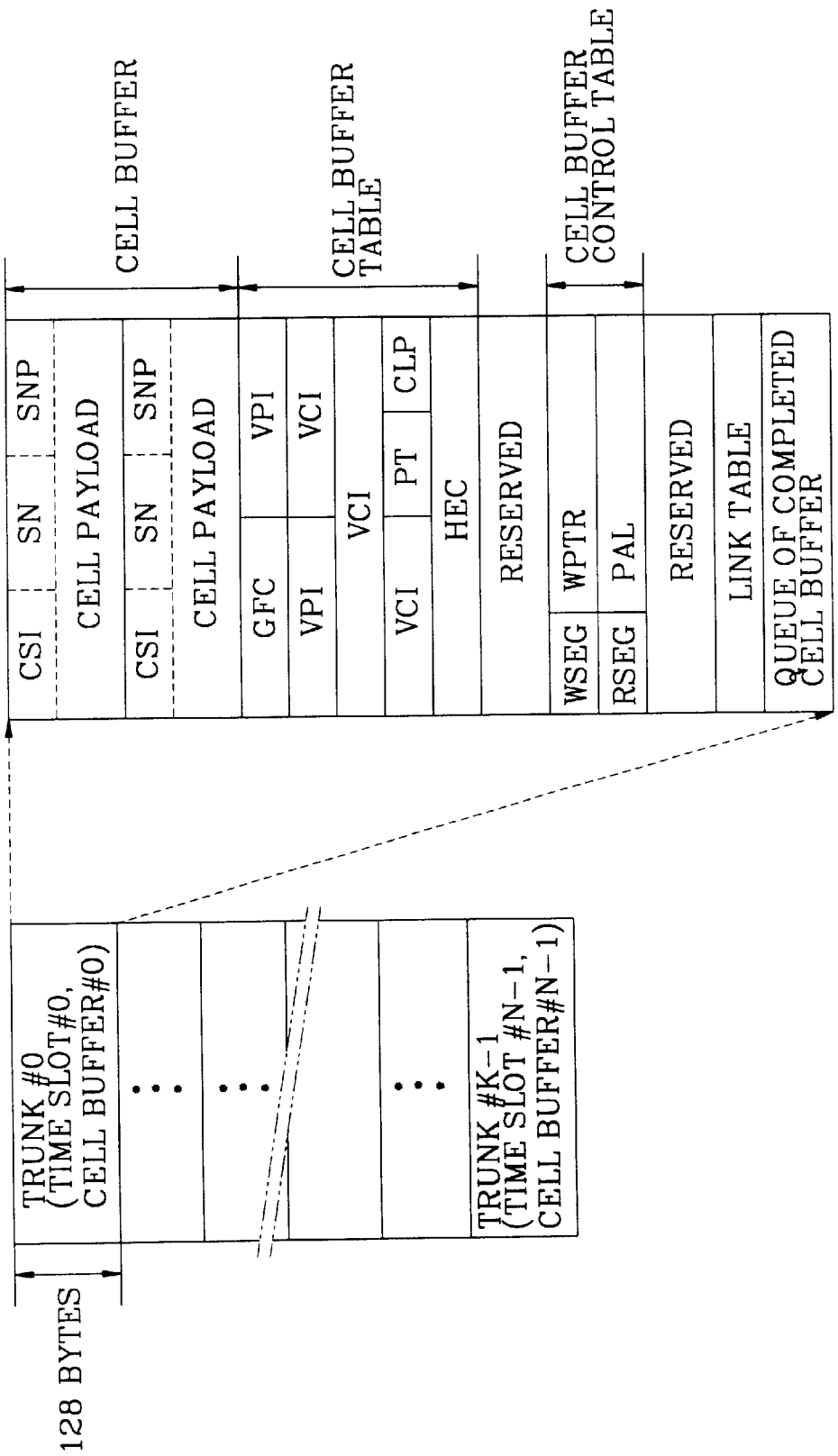
FIG. 9 is a diagram illustrating a map file of a memory unit in FIG. 1.

A cell transmission control unit 16 is comprised of an ATM cell by reading cells and header information stored in the memory unit 15, and transmits the cell to an ATM connection unit through a first-in first-out (FIFO) 17 or stores the ATM cell which is received through a FIFO 18 in the memory unit 15. Here, it is noted that the couple of FIFOs 17, 18 are substantially connected with the ATM connection unit. The memory interface 14 interfaces signals that are transmitted to the memory unit 15 through the data converting unit 12, the cell transmission control unit 16 and a CPU interface 19, while the memory unit 15 contains a link table, a cell buffer control table, a cell header table, a cell buffer and a queue which are respectively allocated in accordance with a trunk number and a time slot number, as shown in FIG. 9. Additionally, it is noted that the CPU interface 19 interfaces signals between the CPU and the memory interface 14.

The operation of the ATM switching apparatus for the switch system according to the first embodiment of the present invention will be described with reference to the accompanying drawings.

Figure 2:
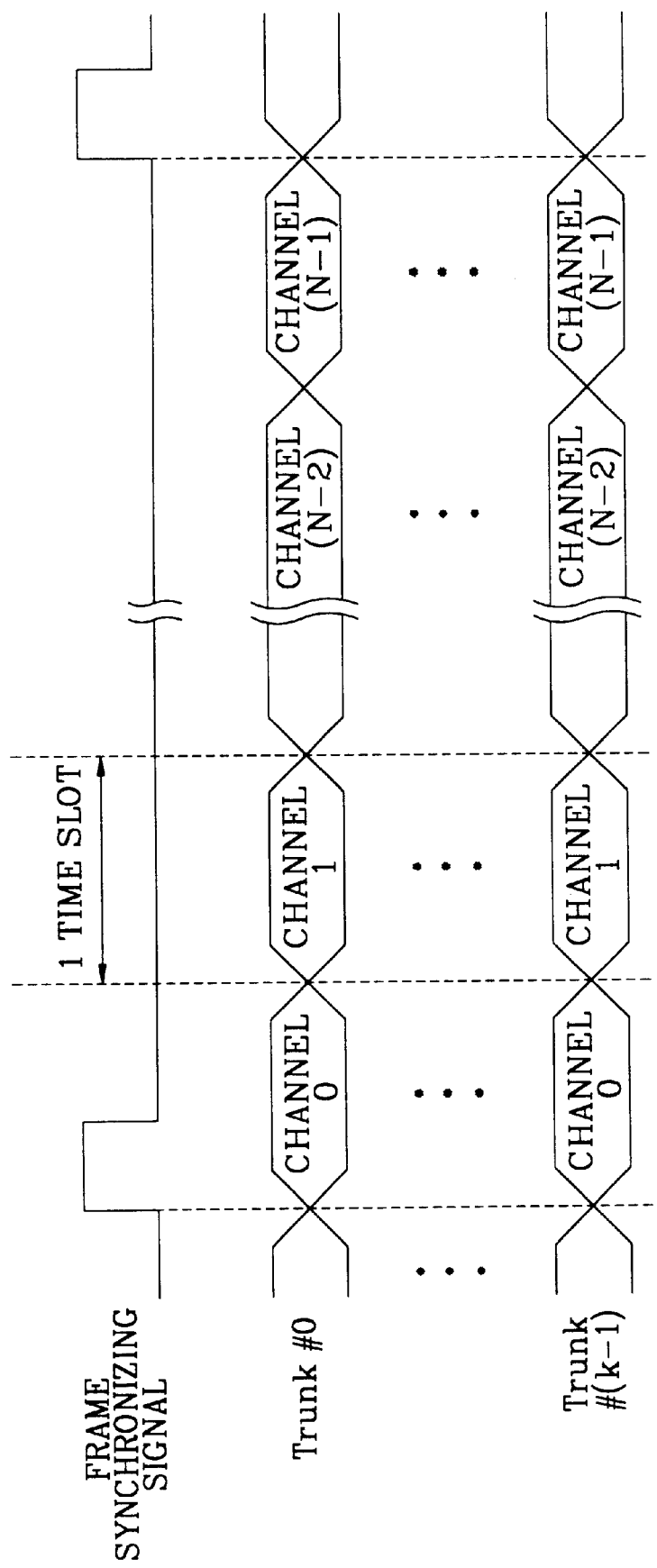
FIG. 2 is a diagram illustrating a corresponding frame of trunk data.

As shown in FIG. 1, in accordance with the frame synchronizing signal supplied from the status/timing signal generating unit 17, the serial/parallel converting unit 10 outputs each trunk datum which is supplied over a K number of trunks trunk #0–trunk #K by converting to 8-bit parallel data by each time slot. That is, each trunk datum has a frame type, as shown in FIG. 2, in accordance with the frame synchronizing signal supplied from the status/timing signal generating unit 13. Here, since a K number of time slot data(for example, a k number of channels 1) exist in one time slot interval, the K number of time slot data constitute an 8-bit parallel data frame over the serial/parallel converting unit 10.

Figure 3:
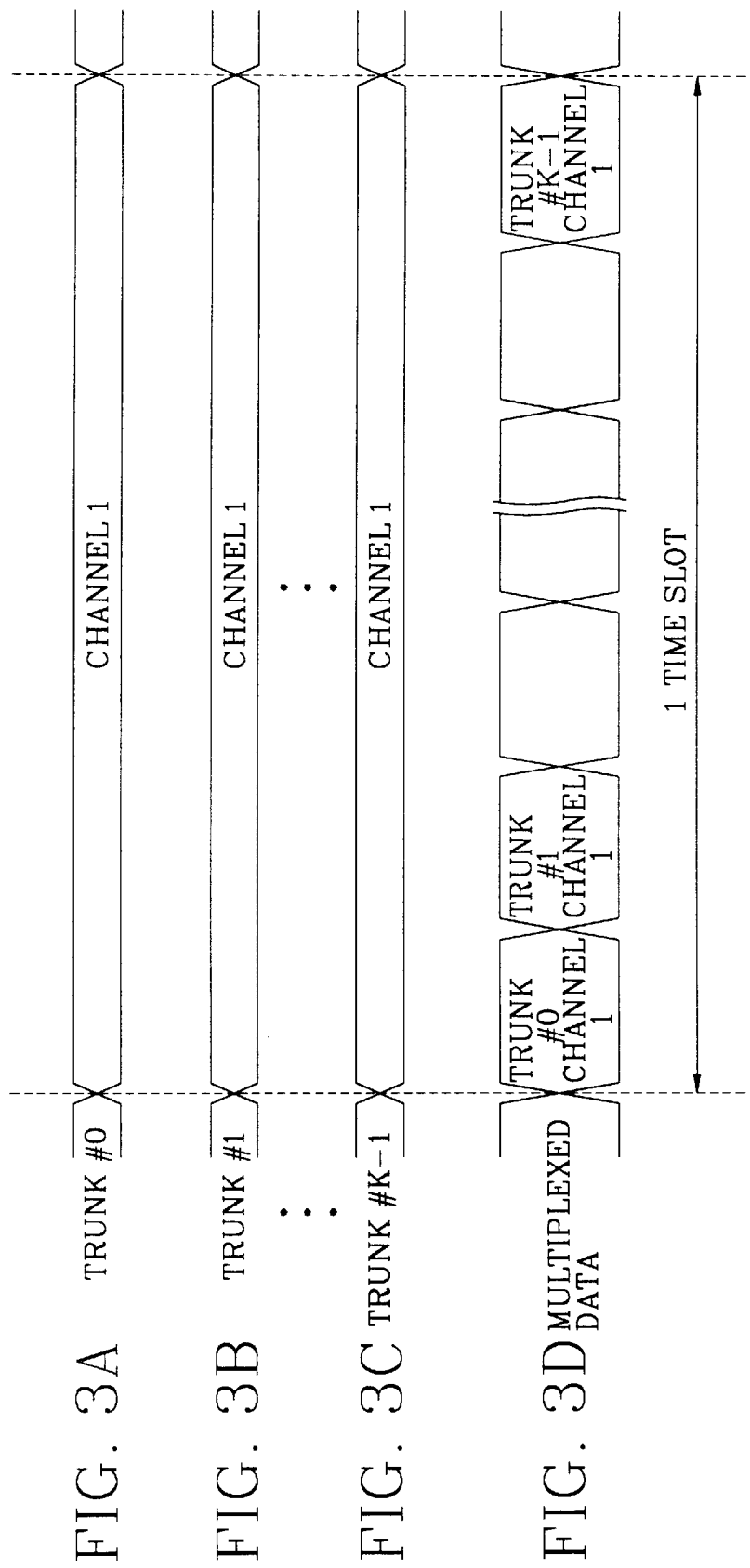
FIGS. 3A through 3D are diagrams illustrating time-division-multiplexed data for a time slot interval.

The data multiplexing/demultiplexing unit 11 is synchronized with the frame synchronizing signal and performs the TDM for the K number of time slot data which are supplied from the serial/parallel converting unit 10 for the one time slot interval, as shown in FIGS. 3A to 3C, to thereby output 8-bit TDM data as in FIG. 3D.

Then, a status machine of the data converting unit 12 is operated by one time slot in accordance with a status signal generated in the status/timing signal generating unit 13, and performs storing the 8-bit data, which have been TDMed in the data multiplexing/demultiplexing unit 11, in a corresponding cell buffer 11 according to a corresponding trunk number and a time slot number. That is, the data converting unit 12 performs a transition, illustrated in FIG. 10 as a flowchart, by a time of which one time slot is divided by K, and stores the data which have been multiplexed in accordance with the trunk number and channel number when applied.

Figure 10:
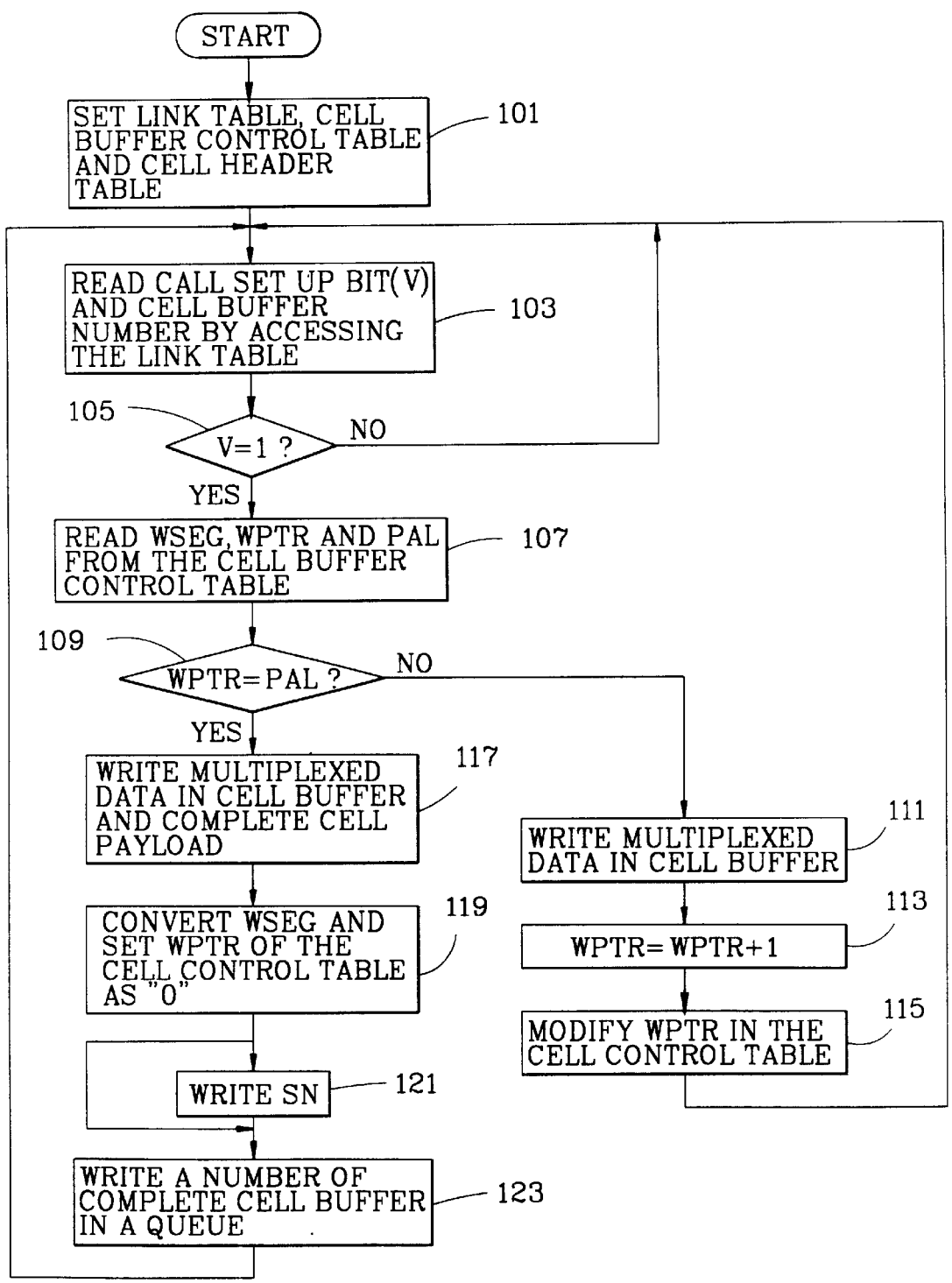
FIG. 10 is a flowchart illustrating a converting operation of a data converting unit in FIG. 1.

Next, the operation of which the data converting unit 12 stores the multiplexed 8-bit data in a corresponding cell buffer will be described with reference to a flowchart of FIG. 10.

In an initial state, as in FIG. 9, the CPU performs an initialization through which the tables provided in the memory unit 15, such as a link table, a cell buffer control table and a cell header table (101), and makes the state machine in the data converting unit 12 to an idle state to thereby transit the data converting unit 12 to the idle state.

Next, the data converting unit 12 accesses the link table as in FIG. 2 in accordance with a trunk number and a time slot number (a channel number) which are supplied from the status/timing signal generating unit 13 by every rising edge of a clock signal of which one time slot is divided by K. For example, the data converting unit 12 reads a call setup bit V and a cell buffer number #1 which correspond to a channel 1 of a trunk #0 (103).

Here, when the call setup bit V which has been read is set up as "1", the data converting unit 12 reads a write segment bit WSEG, a write pointer WPTR and an effective payload length PAL from a cell buffer control table as in FIG. 5 by using the cell buffer number #1 which has been read from the link table as an access address (103, 105), while when the call setup bit V is set up as "0", the converting unit 12 returns to the idle state.

Here, it is noted that a case where the call setup bit V is set up as "1" means that a call is set up in a corresponding time slot data (channel 1).

Then, the data converting unit 12 compares the write pointer WPTR with the effective payload length PAL which have been read. When the values thereof WPTR, PAL are different from each other, the data converting unit writes the multiplex data (the channel 1 of the trunk #0) which are supplied from the data multiplexing/demultiplexing unit 11 in the cell buffer #1 (111), increases the write pointer WPTR by "1" by accessing the cell buffer control table in FIG. 5 and then repeatedly performs the operation after the idle state (113, 115). Here, the reason of increasing the write pointer WPTR by "1" is to write next multiplex data in a residuary writing area of the cell buffer #1.

While, when values of the write pointer WPTR and the effective payload length PAL are identical to each other, the data converting unit 12 writes the multiplex data (the channel 1 of the trunk #0) in the cell buffer #1 to thereby complete a 48-bytes cell payload (117) and, by accessing the cell buffer control table again, converts the write segment bit WSEG as well as sets the write pointer WPTR as "0" for thereby preparing a new cell buffer #1 (119).

Figure 7:
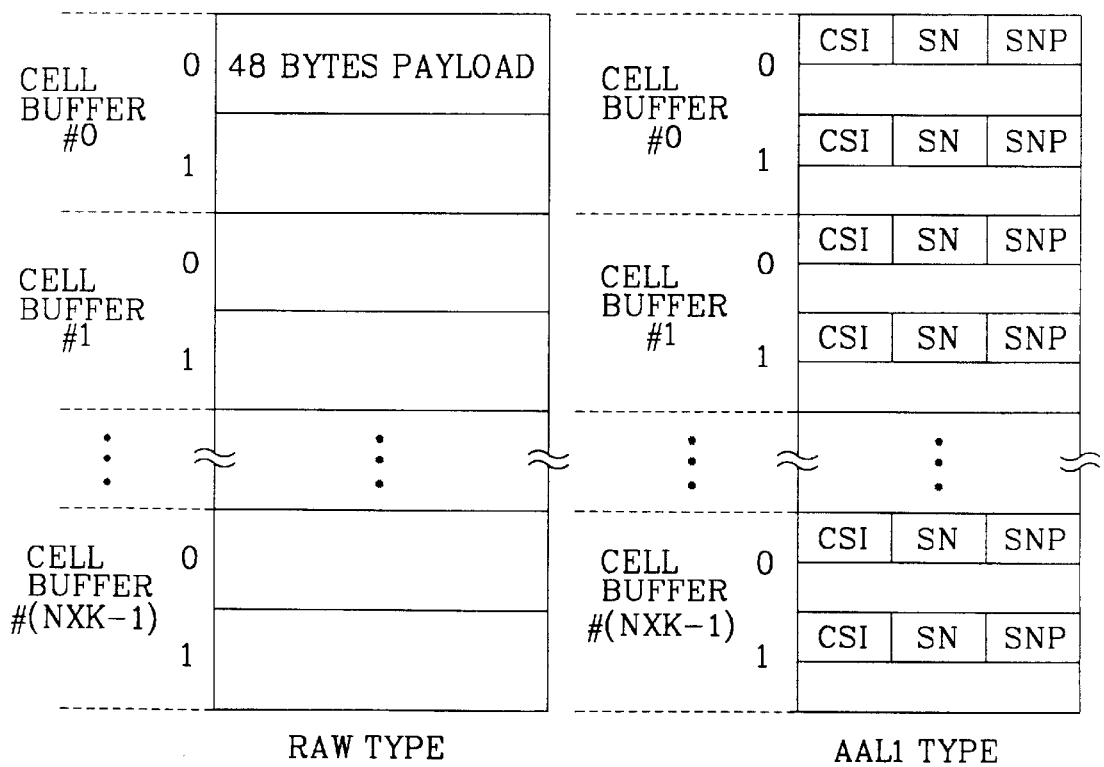
FIG. 7 is a diagram illustrating cell buffers.

In FIG. 7, raw type and AAL1 type cell buffers are respectively illustrated. In this specification, the AAL1 type cell buffer will be explained as an example for convenience sake.

Figure 8:
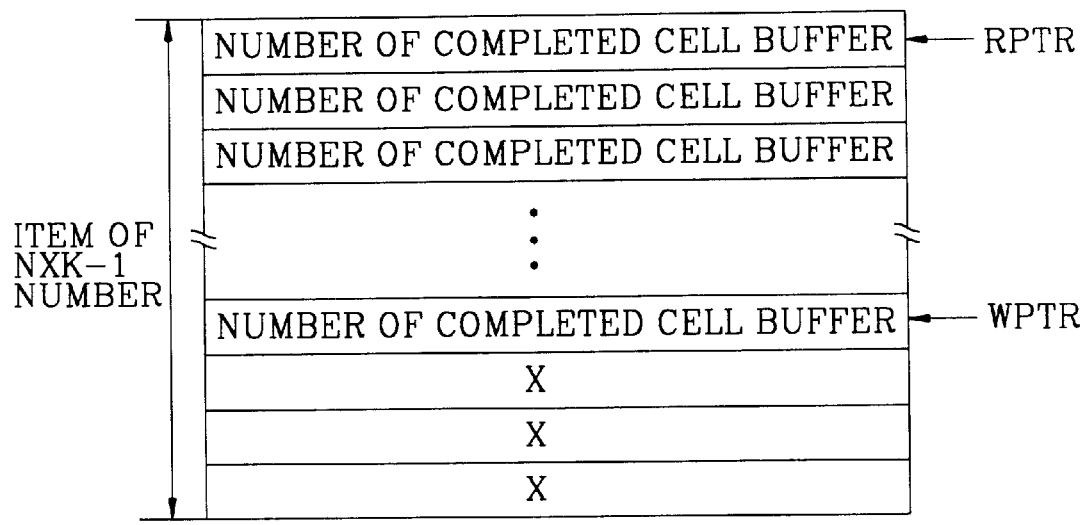
FIG. 8 is a diagram illustrating a queue of completed cell buffer numbers.

The data converting unit 12 writes a sequence number SN in a first byte of the cell buffer #1 which is designated by the corresponding write segment bit WSEG of the cell buffer control table (121), then writes a number of the completed cell buffer #1 in a queue as shown in FIG. 8 (123) and thus finishes the operation to write the multiplex data (the channel 1) with respect to the trunk #0. Here, it is noted that when the cell buffer belongs to the raw type, the SN is not written.

And then, in accordance with the above-described operation, the writing operation is completed by which a channel 1 of each of the other trunks trunk #1–trunk #k−1 which have been multiplexed for the time slot.

When the writing operation of the multiplex data is completed, the cell transmission control unit 16 identifies the cell buffer number which is completed by reading the queue of the memory unit 15 on the basis of the write pointer WPTR which is supplied from the data converting unit 12 and a read pointer RPTR which the control unit 16 manages itself, and increase the read pointer RPTR by "1".

Figure 6:
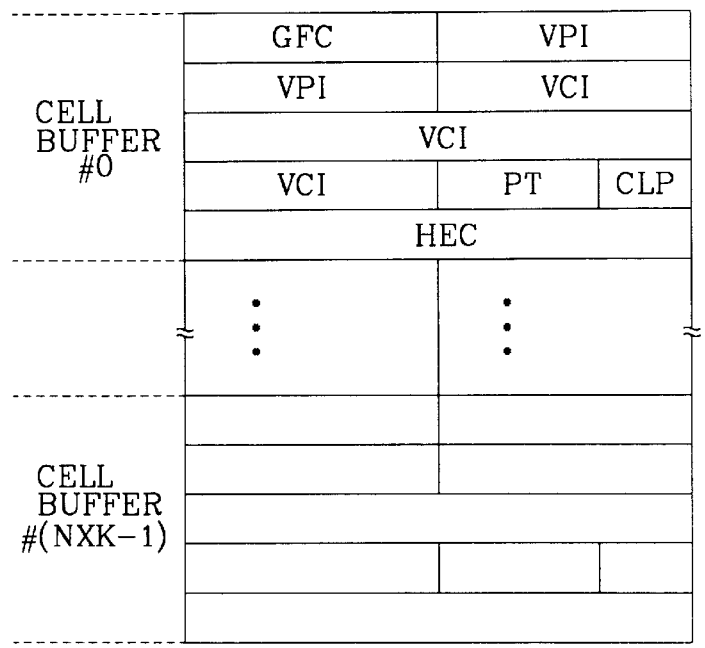
FIG. 6 illustrates a cell header table.

Next, the cell transmission control unit 16 reads a cell header of 5 bytes, corresponding to a cell buffer number, from a cell header table as in FIG. 6, then reads a 48-bytes cell payload from a cell buffer by reading a read segment bit RSEG from the cell buffer control table, and converts the read segment bit RSEG, while the memory interface 14 performs interfacing the signals which are inputted/outputted to/from the memory unit 15 in accordance with the data converting unit 12, the cell transmission control unit 16 and the CPU interface 19. Accordingly, the cell transmission control unit 17 combines the 5-bytes cell header and the 48-bytes cell payload and supplies a 53-bytes fixed length packet (an ATM cell) to an ATM connection unit through the FIFO 17. On contrary, an ATM cell which is received over the ATM connection unit and the FIFO 18 is stored in the memory unit 15 in accordance with the cell transmission unit, while the stored ATM cell is read by the data converting unit 12 by 1 byte and the data which have been read is demultiplexed to parallel data in the data multiplexing/demultiplexing unit 11. The thusly demultiplexed 1-byte parallel data are converted to serial data in the serial/parallel converting unit 10 and outputted to a corresponding trunk connection unit through the K number of trunks.

As described above, according to the first embodiment of the present invention, the TDM data, inputted through the plurality of trunks, are converted to the ATM data and supplied to the ATM switch system, and an ATM cell which are supplied from the ATM switch system are converted to TDM data to be correspondingly outputted to the plurality of trunks. As a result, it is possible to mutually operate a TDM network and an ATM network to thereby establish a high-speed network.

Figure 11:
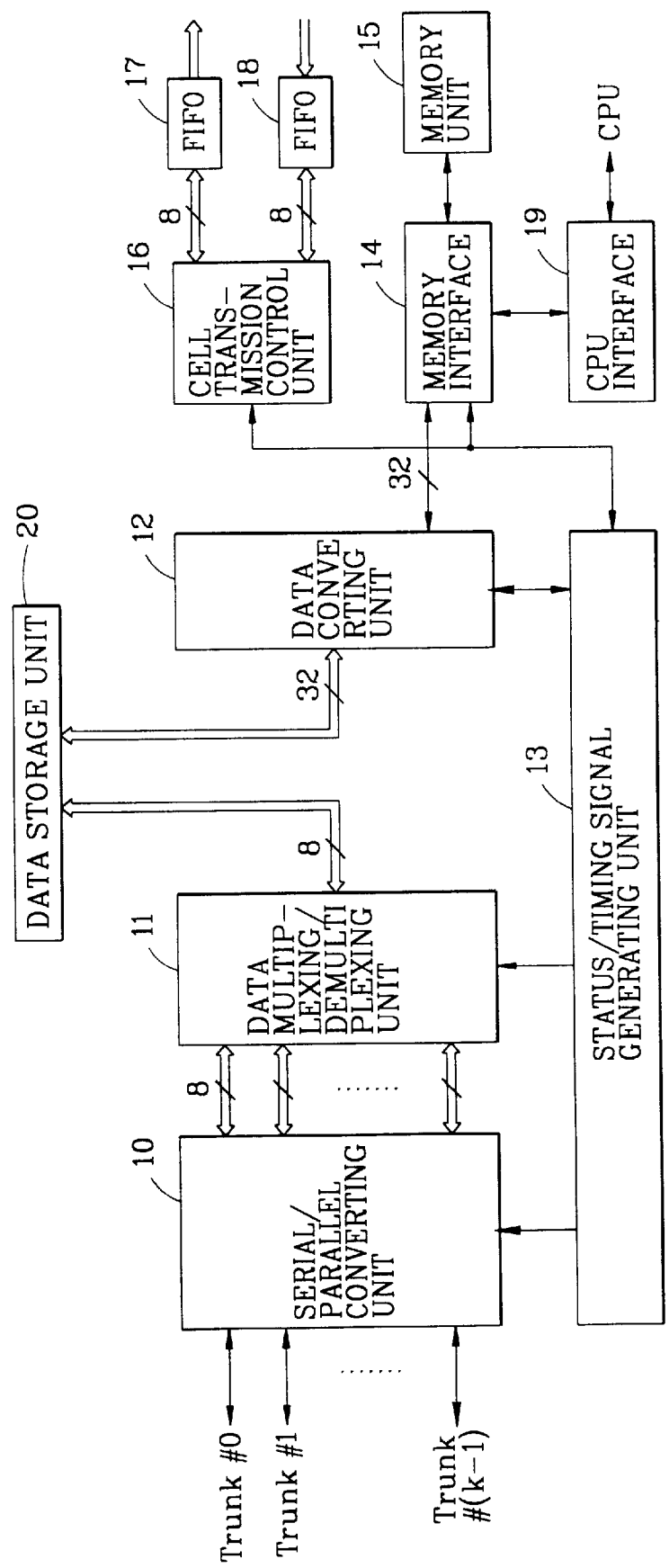
FIG. 11 is a block diagram illustrating an ATM switching apparatus of a switch system according to a second embodiment of the present invention.

FIG. 11 illustrates an ATM switching apparatus for a switch system according to a second embodiment of the present invention, in which a data storage unit 20 which serves as a buffer is additionally connected between the data multiplexing/demultiplexing unit 11 and the data converting unit 12.

The data storage 20, which is divided into a first and a second groups, adjusts an operation speed difference between the two units 11, 12. Also, the first and second groups are alternately used by the units 11, 12.

The data converting unit 12 processes data of N byte for one cycle in accordance with a conversion synchronizing signal outputted from the status/timing signal generating unit 17. Here, it is noted that the cycle of the conversion synchronizing signal is N times as large as that of the frame synchronizing signal as shown in FIG. 12.

The operation of the ATM switching apparatus for the switch system according to the second embodiment of the present invention will be described.

First, Serial data which are inputted to the plurality of trunks are converted to parallel data in the serial/parallel converting unit 10 in accordance with the frame synchronizing signal, and the data multiplexing/demultiplexing unit 11 performs the TDM operation for the parallel data in each trunk. The thusly multiplexed data are stored in the data storage unit 20 in accordance with the trunk number, the time slot number and the frame number, when initially applied. Here, it is noted that a number of frames repeats from 0 to N−1 on the basis of an N number of frames (a reference frame) of the frame synchronizing signal, and thus a single group is formed.

Here, the first and second groups of the data storage unit 20 are alternately accessed by the data multiplexing/demultiplexing unit 11 and the data converting unit 12. Specifically, the data which are supplied from the unit 11 are written in the first group for the period of the reference frame, while the trunk data of N byte, stored in the second group, are read by the data converting unit 12. That is, the data converting unit 12 is operated by having the conversion synchronizing signal (the reference frame) as one cycle, and the status machine processes the trunk data as much as N byte every one time slot cycle.

Here, the number of trunk data TDN which are supplied to the data converting unit 12 during one cycle (the reference frame) of the conversion synchronizing signal can be represented as a following equation (1).

$$TDN = \text{the number of trunks} \times \text{the number of time slots in a frame} \times N \quad (1)$$

In addition, the number of time slots in the reference frame TSN can be shown as follow.

$$TSN = \text{the number of time slots in a frame} \times N \quad (2)$$

In the above equations (1) and (2), N indicates the number of frames in the reference frame.

On the other hand, in the second embodiment of the preset invention, the number of trunk data TDBN of an N-byte unit which are supplied to the data converting unit 12 during the reference frame can be shown as a following equation.

$$TDBN = TDN/N = \text{the number of trunks} \times \text{the number of time slots in a frame} \quad (3)$$

Further, in the case of the first embodiment, the number of trunk data which must be processed by one time slot also can be obtained by applying the above equations (1) and (2), as follows.

$$TDN/TSN = \text{the number of trunks} \quad (4)$$

Additionally, in the second embodiment, the number of trunk data of the N-byte unit which has to be processed by one time slot can obtained by using the equations (2) and (3) as follows.

$$TDBN/TSN = \text{the number of trunks} \quad (5)$$

Accordingly, when concerning data volume to be processed by the status machine for one time slot with respect to the number of trunks from the equations (4) and (5), it is shown that the device according to the second embodiment only processes trunks as many as 1/N of the number of entire trunks as compared to the first embodiment. This indicates that if the status machine of each of the first and second embodiments processes the same volume of the trunks during one time slot, the device according to the second embodiment can contain trunks, N times as many as the case of the first embodiment. Accordingly, the second embodiment of the present invention can multiply the number of trunks N times, without increasing the processing speed of the status machine.

Additionally, when the data converting unit 12 processes the trunk data each of which a call is set up, the number of the trunks can be increased more than N times. Here, some call blocking may be accompanied.

On the other hand, the ATM cell, which are supplied from the ATM switch system through the ATM connection unit and the FIFO 18, is stored in the memory unit 15 as a cell type in accordance with the control of the cell transmission unit 16, and the cell stored in the memory unit 15 is read by N bytes by the data converting unit 12 for thus being written in a corresponding area in accordance with a trunk number and a channel number of a receiving part of the data storage unit 20.

The data multiplexing/demultiplexing unit 11 reads the trunk data by 1 byte from the data storage unit 20 in accordance with the trunk number, the channel number and the frame number, and the data which have been read are demultiplexed to parallel data. The thusly demultiplexed parallel data of 1 byte are converted to serial data in the serial/parallel converting unit 10 and outputted to the trunk connection unit through the corresponding trunks.

As described above, the ATM switching apparatus according to the present invention has an advantage of mutually operating the TDM network and the ATM network by converting the TDM data supplied through the plurality of trunk connection units to the ATM cell and outputting the cell to the ATM connection unit, while converting an ATM cell supplied through the ATM connection unit and outputting the resultant to the trunk connection units, thus eventually establishing a high-speed network. In addition, the present invention has an effect to increase the number of trunks more than N times without increasing the process speed of the data converting unit.

It will be apparent to those skilled in the art that various modifications and variations can be made in the ATM cell converting device for the switch system of the present invention without departing from the spirit or scope of the invention. Thus, it is intended that the present invention cover the modifications and variations of this invention provided they come within the scope of the appended claims and their equivalents.

What is claimed is:

1. An asynchronous transfer mode (ATM) switching apparatus for a switch system, comprising:
   a plurality of trunk connection units connected with a time division multiplexing (TDM) communication network;
   an ATM connection unit connected with an ATM network; and
   an ATM cell converting unit for converting trunk data input through at least one of the trunk connection units to an ATM cell by multiplexing the trunk data and storing the multiplexed trunk data in a cell format in a memory unit in accordance with a trunk number and a time slot number and outputting the ATM cell to the ATM connection unit, and also converting an ATM cell which is input through the ATM connection unit to trunk data and outputting the trunk data to at least one of the trunk connection units.

2. The apparatus according to claim 1, wherein the ATM cell converting unit comprises:
   a status and timing signal generating unit that generates a frame synchronizing signal, a trunk number, a time slot number and a converting synchronizing signal in accordance with the control of a central processing unit (CPU);
   a serial and parallel converting unit that performs a converting operation between the trunk data and 8-bit parallel data in accordance with the frame synchronizing signal;
   a data storage unit;
   a data multiplexing and demultiplexing unit that multiplexes the converted 8-bit parallel data to TDM data and stores the TDM data in the data storage unit or demultiplexes TDM data read from the data storage unit to the 8-bit parallel data and outputs the 8-bit parallel data to the serial and parallel converting unit;
   a data converting unit that reads data from the data storage unit and writes it in the memory unit in a cell format, or reads a cell from the memory unit and outputs it to the data storage unit; and
   a cell transmission control unit that constitutes the ATM cell by accessing the memory unit and outputs the ATM cell to the ATM connection unit or writes the ATM cell transmitted from the ATM connection unit in the memory unit.

3. The apparatus according to claim 2, wherein the data storage unit is divided into first and a second storing parts, each of the first and second storing parts being alternately accessed by the data multiplexing and demultiplexing unit and the data converting unit in accordance with the trunk number, the time slot number and a frame number.

4. The apparatus according to claim 2, wherein a cycle of the converting synchronizing signal is N times as large as the frame synchronizing signal, and the data converting unit processes data of N bytes for one cycle of the converting synchronizing signal, wherein N is an integer greater than 1.

5. The apparatus according to claim 2, wherein the memory unit comprises:
   a link table in which numbers of cell buffers corresponding to the trunk number and time slot number are stored;
   a cell buffer control table in which a write segment bit, a read segment bit, a write pointer and an effective payload length of each cell buffer is stored;
   a cell header table in which header information of a cell is stored;
   a plurality of cell buffers that store the TDM data output from the data converting unit; and
   a queue that stores numbers of cell buffers each of which a cell payload is completed.

6. An ATM switching apparatus, comprising:
   a plurality of trunk connection units connected with a (TDM) network;
   an ATM connection unit connected with an ATM network; and
   an ATM cell converting unit for converting trunk data input through at least one of the trunk connection units to an ATM cell and outputting the ATM cell to the ATM connection unit, and also converting an ATM cell input through the ATM connection unit to trunk data and outputting the trunk data to at least one of the trunk connection units,
   wherein the ATM cell converting unit comprises:
      a status and timing signal generating unit that generates control signals under control of a central processing unit (CPU);
      a serial and parallel converting unit connected with the plurality of trunk connection units for converting trunk data to 8-bit parallel data or 8-bit parallel data to trunk data in accordance with said control signals;
      a data multiplexing and demultiplexing unit that multiplexes 8-bit parallel data to TDM data or demultiplexes TDM data to 8-bit parallel data;
      a memory unit;
      a data converting unit that writes TDM data stored in the memory unit in a cell format in accordance with a trunk number and a time slot number, or reads a cell from the memory unit and outputs it to the data multiplexing and demultiplexing unit; and
      a cell transmission control unit that outputs the ATM cell formed by reading the cell and header information from the memory unit to the ATM connection unit or writes the ATM cell received from the ATM connection unit in the memory unit.

7. The apparatus as in claim 6, further comprising:
   a memory interface that interfaces a signal transmission between the data converting unit and the memory unit, and between the cell transmission control unit and the memory unit; and a CPU interface that interfaces signal transmission between the memory interface and the CPU.

8. The apparatus according to claim 6, wherein the memory unit comprises:

a plurality of cell buffers that store TDM data output from the data converting unit;

a link table in which numbers of cell buffers corresponding to the trunk number and time slot number are stored;

a cell buffer control table in which a write segment bit, a read segment bit, a write pointer and an effective payload length of each cell buffer is stored;

a cell header table in which header information of cell is stored; and a queue that stores numbers of cell buffers each of which a cell payload is completed.

9. The apparatus according to claim 6, wherein the data converting unit includes a status machine which is operated by one time slot cycle in accordance with a status signal supplied from the status and timing signal generating unit, and wherein the data converting unit stores TDM data to the memory unit in accordance with the trunk number and time slot number.

10. The apparatus according to claim 6, wherein the data converting unit processes the TDM data of 1 byte for one cycle of a frame synchronizing signal supplied from the status and timing signal generating unit.

11. The apparatus according to claim 8, wherein the cell transmission control unit constitutes an ATM cell of 53 bytes by reading a cell header of 5 bytes which corresponding to a number of the cell buffer from the cell header table and reading a cell payload of 48 bytes from the cell buffer.

12. The apparatus of claim 6, wherein the control signals include a frame synchronizing signal, a status signal, a trunk number, and a time slot number.

13. The apparatus of claim 12, wherein the serial and parallel converting unit converts trunk data to 8-bit parallel data or 8-bit parallel data to trunk data in accordance with the frame synchronizing signal.

14. The method of claim 12, wherein the memory unit comprises:

a plurality of cell buffers that store the TDM data output from the data converting unit;

a link table which stores numbers of cell buffers corresponding to the trunk number and time slot number;

a cell buffer control table which stores a write segment bit, a read segment bit, a write pointer and an effective payload length of each cell buffer;

a cell header table which stores header information of a cell; and a queue which stores numbers of cell buffers each of which a cell payload is completed.

15. An asynchronous transfer mode (ATM switching apparatus for a switch system, comprising:

a plurality of trunk connection units connected with a time division multiplexing (TDM) communication network;

an ATM connection unit connected with an ATM network; and an ATM cell converting unit connected between the plurality of trunk connection units and the ATM connection unit, and converting trunk data to an ATM cell or converting the ATM cell to the trunk data, the ATM cell converting unit comprising, a status and timing signal generating unit that generates a frame synchronizing signal, a status signal, a trunk number and a time slot number in accordance with the control of a central processing unit (CPU), a serial and parallel converting unit that performs a converting operation between the trunk data and 8 bit parallel data, a data multiplexing and demultiplexing unit that multiplexes the 8-bit parallel data to a TDM data or demultiplexes the TDM data to the 8-bit parallel data, a memory unit, a data converting unit that writes the TDM data in the memory unit as a cell format in accordance with the trunk number and the time slot number or reads the cell from the memory unit and outputs it to the data multiplexing and demultiplexing unit, and a cell transmission control unit that outputs the ATM cell formed by reading a cell and header information from the memory unit to the ATM connection unit or writes the ATM cell received from the ATM connection unit in the memory unit.

16. The apparatus according to claim 15, wherein the data converting unit includes a status machine which is operated by one time slot cycle in accordance with a status signal supplied from the status and timing signal generating unit, the data converting unit storing the TDM data in the memory unit in accordance with the trunk number and time slot number and processing data of 1 byte for one cycle of the frame synchronizing signal.

17. The apparatus according to claim 15, wherein the memory unit comprises:

a link table in which numbers of cell buffers corresponding to the trunk number and time slot number are stored;

a cell buffer control table in which a write segment bit, a read segment bit, a write pointer and an effective payload length of each cell buffet is stored;

a cell header table in which header information of a cell is stored;

a plurality of cell buffers that store the TDM data output from the data converting unit; and a queue that stores numbers of cell buffers each of which a cell payload is completed.

18. An asynchronous transfer mode (ATM) switching apparatus for a switch system, comprising:

a plurality of trunk connection units connected with a time division multiplexing (TDM) communication network;

an ATM connection unit connected with an ATM network; and an ATM cell converting unit connected between the plurality of trunk connection units and the ATM connection unit, and converting trunk data to an ATM cell or converting the ATM cell to the trunk data, the ATM cell converting unit includes a status and timing signal generating unit that generates a frame synchronizing signal, a status signal, a trunk number and a time slot number in accordance with the control of a central processing unit (CPU), a serial and parallel converting unit that performs a converting operation between trunk data and 8-bit parallel data in accordance with the frame synchronizing signal, a data storage unit, a data multiplexing and demultiplexing unit that multiplexes the converted 8-bit parallel data supplied from the serial and parallel converting unit to a TDM data and stores the TDM data in the data storage unit or demultiplexes the TDM data read from the data storage unit to the 8-bit parallel data and outputting it to the serial and parallel converting unit, a memory unit, a data converting unit that reads a data of the data storage unit and writes it in the memory unit as a cell format or reads the cell from the memory unit and outputs it to the data storage unit, and a cell transmission control unit that outputs the ATM cell formed by reading a cell and header information from the memory unit to the ATM connection unit or writes the ATM cell transmitted from the ATM connection unit in the memory unit.

19. The apparatus according to claim 18, wherein the data storage unit is divided into a first and a second storing parts, each of the first and second storing parts being alternately accessed by the data multiplexing and demultiplexing unit and the data converting unit in accordance with a trunk number, a time slot number and a frame number.

20. The apparatus according to claim 18, wherein a cycle of the converting synchronizing signal is N times as large as the frame synchronizing signal, and the data converting unit processes data of N byte for one cycle of the converting synchronizing signal, wherein N is an integer greater than 1.

21. The apparatus according to claim 18, wherein the memory unit comprises:

a link table in which numbers of cell buffers corresponding to the trunk number and time slot number are stored;

a cell buffer control table in which a write segment bit, a read segment bit, a write pointer and an effective payload length of each cell buffer is stored;

a cell header table in which header information of a cell is stored;

a plurality of cell buffers that store the TDM data output from the data converting unit; and a queue that stores numbers of cell buffers each of which a cell payload is completed.

22. An asynchronous transfer mode (ATM) switching method, comprising:

initializing a link table, a cell buffer control table and a cell header table provided in a memory unit;

reading a cell buffer number by accessing the link table in accordance with a trunk number and a time slot number which are supplied from a status and timing signal generating unit;

reading a write segment bit, a write pointer and an effective payload length from the cell buffer control table by using the cell buffer number which have been read;

completing a cell payload by writing multiplexed trunk data in a corresponding cell buffer until the write pointer and the effective payload length have an identical value;

writing a corresponding cell buffer number in a queue when the cell payload is completed;

reading a number of the cell buffer in which the cell payload is completed from the queue and reading a corresponding cell header from the cell header table on the basis of the cell buffer number which has been read; and outputting an ATM cell formed from the cell header and cell payload which have been read to an ATM connection unit.

23. The method as in claim 22, further comprising increasing the write pointer in the cell buffer control table in order to write the multiplexed data in a residuary writing area of a corresponding cell buffet, in case the write pointer is different from the effective payload length.

24. An asynchronous transfer mode (ATM) switching method, comprising:

generating a frame synchronizing signal, a status signal, a trunk number and a time slot number under control of a central processing unit (CPU);

converting the trunk data input through a plurality of trunk connection units into 8-bit parallel data in accordance with the frame synchronization signal;

multiplexing the 8-bit parallel data to a time division multiplexing (TDM) data;

writing the TDM data in a memory unit in a cell format in accordance with the trunk number and the time slot number; and forming an ATM cell by reading the TDM data in said cell format and header information from the memory unit and outputting the ATM cell to the ATM connection unit.

25. The method of claim 24, wherein the writing step comprises:

initializing a link table, a cell buffer control table and a cell header table provided in a memory unit;

reading a cell buffer number by accessing the link table in accordance with a trunk number and a time slop number supplied for a status and timing signal generating unit;

reading a write segment bit, a write pointer and an effective payload length from the cell buffer control table using the cell buffer number which has been read;

completing a cell payload by writing multiplexed trunk data in a corresponding cell buffer until the write pointer and the effective payload length have an identical value;

writing a corresponding cell buffer number in a queue when the cell payload is completed.

26. The method of claim 24, wherein the forming step comprises:

reading a number of the cell buffer in which the cell payload is completed from the queue;

reading a corresponding cell header from the cell header table based on the cell buffer number which has been read; and outputting an ATM cell formed from the cell header and cell payload which have been read an ATM connection unit.

* * * * *